GEORGE W. MILLNER.
Improvement in Seed Drills.

No. 115,553. Patented May 30, 1871.

UNITED STATES PATENT OFFICE.

GEORGE W. MILLNER, OF CHARLOTTETOWN, PRINCE EDWARD ISLAND.

IMPROVEMENT IN SEED-DRILLS.

Specification forming part of Letters Patent No. 115,553, dated May 30, 1871.

*To all whom it may concern:*

I, GEORGE W. MILLNER, of Charlottetown, Queens county, Prince Edward Island, have invented a certain new and useful Improvement in Seed-Drills, of which the following is a complete specification:

Nature and Object of the Invention.

The nature of my invention consists in the arrangement of parts, which can only be understood by reference to the specification and drawing.

General Description.

Figure 1:
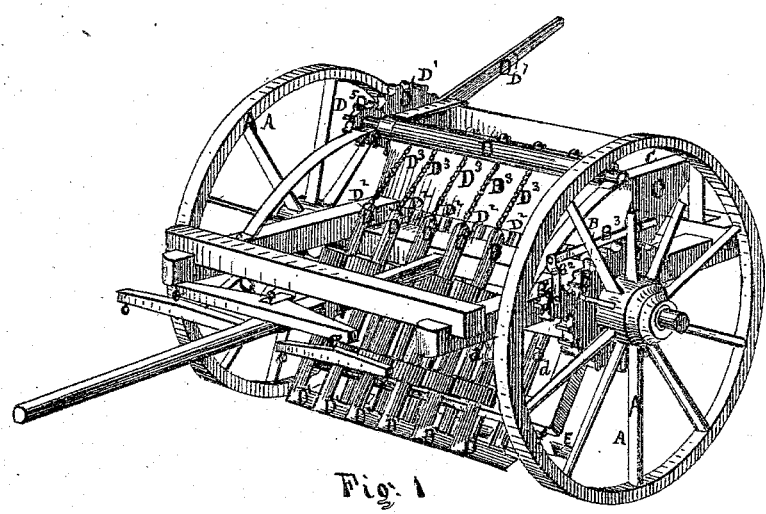
Figure 1 is a perspective view of my invention.
Figure 3:
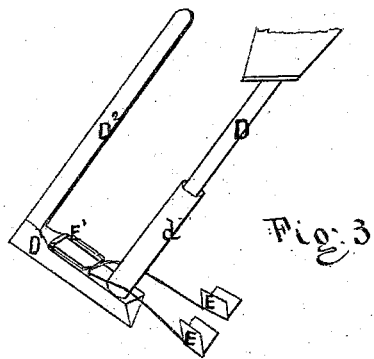
Fig. 3 is a perspective view of one of the seed-distributers.
Figure 2:
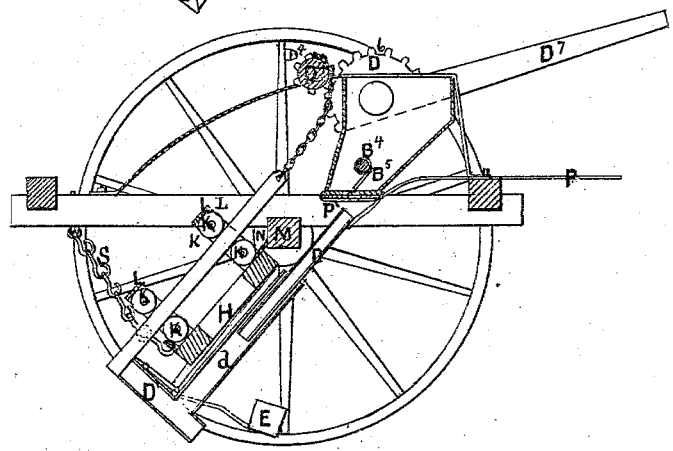
Fig. 2 is a vertical section of the same.

The wheels, frames, thills, &c., of my seed-drill are made as shown in the drawing, or in any desirable manner which shall accommodate the operating parts of my invention. C is the seed-receptacle, and extends entirely across the frame from wheel to wheel. From the lower side of the seed-receptacle C a series of tubes, D D, extend downward, as shown. Between the upper ends of these tubes and the lower side of the box C a plate, P', is arranged to slide back and forth, and is provided with holes corresponding with those made in the lower side of the box C, the whole so arranged, in connection with the pipes D and the handle or lever P, that, by the movement of this handle, all the openings in the box C may be opened or closed by one movement. $B^4$, Fig. 2, is a shaft extending through the seed-box, and is provided with a number of downwardly-projecting arms, $B^5$, which serve as agitators to prevent the seed from clogging.

Motion is given to the shaft $B^4$ by the arm $B^3$, link $B^2$, crank-pinion $B^1$, and the gear B.

Each one of the seed-tubes D has connected with it a sliding extension, $d$, which enters into a cross-tube, $D^1$. This cross-tube $D^1$ is triangular in section, its lower angle serving, when the machine is in operation, to make a small drill or furrow for receiving the seed. E E are triangular coverers hinged to the part $D^1$ at $E^1$, their function being to cover the seed after it has been deposited. $D^2$ $D^2$, &c., is a series of sliding rods, to the lower ends of which the cross-tubes $D^1$ $D^1$ are attached. These rods $D^2$ slide on friction-rolls K K, on standards L L, &c., Fig. 2, which are attached to a swinging frame, H. Each one of the rods $D^2$ is attached to the shaft $D^4$ by the chain $D^3$, so that if the shaft $D^4$ is caused to revolve the rods $D^2$ will be drawn up, taking with them the cross-tubes $D^1$ and the extension $d$. The shaft $D^4$ is made to revolve by the segment-gear $D^6$ and lever $D^7$. The frame H is attached to the axle-tree M by the hinge N.

The position of the frame H may be changed by lengthening or shortening the chain S.

The operation of my machine is as follows: The receptacle C is first filled with seed to be sown, the opening $c$ in the lower part of the box being closed by the slide P', and the cross-tube or drill-making tube being drawn up. In this condition the machine is ready for the field, and may be drawn as readily as a wagon. When it is desirable to sow, the cross or drill-making tubes $D^1$ $D^1$, &c., may be lowered so as to come in contact with the ground, and the orifices $c$ in the lower part of the seed-box may be opened, so that the seed may fall into the tubes D, and then through the extensions $d$ and the cross-tube $D^1$ to the drill. As this takes place while the machine is in motion the coverers E E will immediately draw the earth back into the drill.

Claims.

I claim as my invention—

1. The adjustable tube $D^1$, in combination with the extension tube $d$ and the bar $D^2$, arranged to operate substantially as described, and for the purpose set forth.

2. The combination of the frame H with the axle-tree M and adjusting-chain S, when the same is arranged in connection with the sliding bar $D^2$ so as to determine the inclination of the tube $D^1$, substantially as described, and for the purpose set forth.

GEORGE W. MILLNER.

Witnesses:
JOS. H. CURTIS,
CHAS. J. BATEMAN.